United States Patent
Lee

(10) Patent No.: US 9,855,935 B2
(45) Date of Patent: Jan. 2, 2018

(54) EMERGENCY BRAKING SYSTEM FOR PROTECTING MOVING OBJECT AND METHOD FOR CONTROLLING THE SAME

(71) Applicant: MANDO CORPORATION, Pyeongtaek-si, Gyeonggi-do (KR)

(72) Inventor: Hyung Jik Lee, Seongnam-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 195 days.

(21) Appl. No.: 14/799,573

(22) Filed: Jul. 15, 2015

(65) Prior Publication Data

US 2016/0016561 A1 Jan. 21, 2016

(30) Foreign Application Priority Data

Jul. 16, 2014 (KR) ........................ 10-2014-0090071

(51) Int. Cl.
*B60T 7/22* (2006.01)
*B60T 8/171* (2006.01)
(Continued)

(52) U.S. Cl.
CPC ................ *B60T 7/22* (2013.01); *B60R 21/00* (2013.01); *B60T 8/171* (2013.01); *B60T 8/172* (2013.01); *B60T 2201/022* (2013.01)

(58) Field of Classification Search
CPC . B60T 7/22; B60T 8/171; B60T 8/172; B60T 2201/022; B60R 21/00
See application file for complete search history.

(56) References Cited

U.S. PATENT DOCUMENTS 8,362,922 B2\* 1/2013 Kushi .............. G08G 1/096716
340/436
2008/0097699 A1\* 4/2008 Ono .................... B60R 21/0134
701/300
(Continued)

FOREIGN PATENT DOCUMENTS

CN 102171743 A 8/2011
CN 202413767 U 9/2012
(Continued)

OTHER PUBLICATIONS

German Office Action dated Sep. 12, 2016 in connection with the counterpart German Patent Application No. 102015009208.1.
(Continued)

*Primary Examiner* — Mussa A Shaawat
(74) *Attorney, Agent, or Firm* — Hauptman Ham, LLP

(57) ABSTRACT

Provided is an emergency braking system, including: a receiving unit that receives sensing signals sensed by the sensing unit; a prediction position selecting unit that, when the moving object is sensed through fusion between the sensing signals received by the receiving unit, selects a lateral prediction position of the moving object predicted to collide with the vehicle according to a lateral movement of the moving object; and a braking determining unit that predicts collision and provides an emergency braking control signal to a braking unit when the prediction position selected by the prediction position selecting unit is located inside a vehicle width, and determines a braking control of the braking unit when the prediction position is located outside the vehicle width, so as to suspend a control of the braking unit.

7 Claims, 6 Drawing Sheets

(51) Int. Cl.
    *B60T 8/172*     (2006.01)
    *B60R 21/00*     (2006.01)

(56) References Cited

U.S. PATENT DOCUMENTS

| | | | | |
|---|---|---|---|---|
| 2009/0299576 A1* | 12/2009 | Baumann | ............ | B60R 21/0134 |
| | | | | 701/45 |
| 2011/0125372 A1* | 5/2011 | Ito | ............ | B60R 21/0132 |
| | | | | 701/45 |
| 2012/0283895 A1* | 11/2012 | Noda | ............ | G08G 1/166 |
| | | | | 701/1 |

FOREIGN PATENT DOCUMENTS

| | | | |
|---|---|---|---|
| CN | 102741901 A | 10/2012 | |
| CN | 102887147 A | 1/2013 | |
| DE | 102014105696 A1 | 10/2014 | |
| KR | 20090078976 A | 7/2009 | |

OTHER PUBLICATIONS

Chinese Office Action dated Sep. 14, 2017 from SIPO in connection with the counterpart Chinese Patent Application No. 201510411997.4.

\* cited by examiner

EMERGENCY BRAKING SYSTEM FOR PROTECTING MOVING OBJECT AND METHOD FOR CONTROLLING THE SAME

CROSS-REFERENCE(S) TO RELATED APPLICATION

This application claims priority of Korean Patent Application No. 10-2014-0090071, filed on Jul. 16, 2014, in the Korean Intellectual Property Office, which is hereby incorporated by reference in its entirety.

BACKGROUND OF THE INVENTION

Field of the Invention

The present invention relates to an emergency braking system for protecting a moving object and a method for controlling the same, and more particularly, to an emergency braking system for protecting a moving object, which provides an emergency braking control signal to a braking unit when a lateral prediction position of the moving object is located inside a vehicle width, and suspends an emergency braking control of the braking unit when the lateral prediction position of the moving object is located outside the vehicle width, and a method for controlling the same.

Description of the Related Art

As the number of vehicles increases, damages caused by vehicle collision has increased. In particular, upon collision of pedestrians and vehicles, a pedestrian morality rate rapidly increases. In order to prevent these damages, there have been developed apparatuses for sensing the presence or absence of an obstacle in front of a vehicle and a kind of the obstacle by using a radar or a camera mounted in front of the vehicle, so that a warning can be given to a driver and the vehicle can be automatically decelerated even though the driver does not slow down the vehicle carelessly.

Since these conventional apparatuses treat only one of a vehicle collision and a pedestrian collision, it has been intended to recognize only the vehicle or the pedestrian as the obstacle.

In particular, the conventional emergency braking system sets a warning braking distance as a warning region and an emergency braking control distance as a braking region in front of the vehicle width, and performs a warning and a braking when the moving object around the vehicle is located at a corresponding position.

Referring to FIG. 4, in a conventional emergency braking system, scenarios S1, S2, and S3 may occur due to a lateral movement at a position P1 of an initial moving object, for example, a pedestrian P1. At this time, a warning and a braking control may occur in the scenarios S2 and S3.

On the other hand, in the case of the scenario S3, since a position P4' is a warning position, the conventional emergency braking system operates the warning and the automatic emergency braking. However, since the collision with the vehicle does not occur at a position P4, the driver may feel embarrassing if the conventional emergency braking system operates the warning and the automatic emergency braking.

Therefore, there is a need for an improved emergency braking system that is capable of predicting a lateral prediction position of a moving object and operating a warning and an automatic emergency braking at a predicted collision position in consideration of the predicted lateral prediction position.

CITATION LIST

Patent Literature

Korean Patent Application Laid-Open No. 2009-0078976 (2009 Jul. 21), entitled "CONTROL METHOD FOR WARNING AND PREVENTING COLLISION OF VEHICLE WITH PEDESTRIAN"

SUMMARY OF THE INVENTION

The present invention is directed to provide an emergency braking system for protecting a moving object, which provides an emergency braking control signal to a braking unit when a lateral prediction position of the moving object is located inside a vehicle width, and suspends an emergency braking control of the braking unit when the lateral prediction position of the moving object is located outside the vehicle width, and a method for controlling the same.

According to an embodiment of the present invention, an emergency braking system, including a sensing unit installed in a vehicle to sense a moving object around the vehicle, includes: a receiving unit that receives sensing signals sensed by the sensing unit; a prediction position selecting unit that, when the moving object is sensed through fusion between the sensing signals received by the receiving unit, selects a lateral prediction position of the moving object predicted to collide with the vehicle according to a lateral movement of the moving object; and a braking determining unit that predicts collision and provides an emergency braking control signal to a braking unit when the prediction position selected by the prediction position selecting unit is located inside a vehicle width, and determines a braking control of the braking unit when the prediction position is located outside the vehicle width, so as to suspend a control of the braking unit.

The prediction position selecting unit may calculate a time to collision (TTC) by using a velocity of the vehicle and a longitudinal distance between the vehicle and the moving object, and select a lateral prediction position of the moving object by using the calculated time to collision, a lateral distance between the vehicle and the moving object, and a lateral velocity. When the prediction position is located inside the vehicle width, the braking determining unit may determine an emergency braking, a warning, or an emergency braking suspension according to whether a longitudinal distance between the vehicle and the moving object is within a preset warning braking distance and a preset emergency braking control distance. The braking determining unit may provide the emergency braking control signal to the braking unit when the prediction position is located inside the vehicle width and a distance between the vehicle and the moving object is within the warning braking distance and the emergency braking control distance. The braking determining unit may provide a preset warning signal when the distance between the vehicle and the moving object is within the warning braking distance and out of the emergency braking distance. The braking determining unit may provide a suspension control signal for suspending the braking control of the braking unit when the distance between the vehicle and the moving object is out of the warning braking distance.

The moving object may be a pedestrian, a bicycle, or a motorcycle.

According to another embodiment of the present invention, a method for controlling an emergency braking system, including a sensing unit installed in a vehicle to sense a moving object around the vehicle, includes: receiving sensing signals sensed by the sensing unit; when the moving object is sensed through fusion between the received sensing signals, selecting a lateral prediction position of the moving object predicted to collide with the vehicle according to a lateral movement of the moving object; and predicting collision and providing an emergency braking control signal to a braking unit when the selected prediction position is located inside a vehicle width, and determining a braking control of the braking unit when the selected prediction position is located outside the vehicle width, so as to suspend a control of the braking unit.

The selecting step may include: calculating a time to collision (TTC) by using a velocity of the vehicle and a longitudinal distance between the vehicle and the moving object; and selecting a lateral prediction position of the moving object by using the calculated time to collision, a lateral distance between the vehicle and the moving object, and a lateral velocity. When the prediction position is located inside the vehicle width, the determining step may include determining an emergency braking, a warning, or an emergency braking suspension according to whether a longitudinal distance between the vehicle and the moving object is within a preset warning braking distance and a preset emergency braking control distance. In the determining step, the emergency braking control signal may be provided to the braking unit when the prediction position is located inside the vehicle width and a distance between the vehicle and the moving object is within the warning braking distance and the emergency braking control distance. A preset warning signal may be provided to the braking unit when the distance between the vehicle and the moving object is within the warning braking distance and out of the emergency braking distance. A suspension control signal for suspending the braking control of the braking unit may be provided to the braking unit when the distance between the vehicle and the moving object is out of the warning braking distance.

DETAILED DESCRIPTION OF EXEMPLARY EMBODIMENTS

Hereinafter, preferred embodiments of the present invention will be described in detail with reference to the accompanying drawings.

Figure 1:
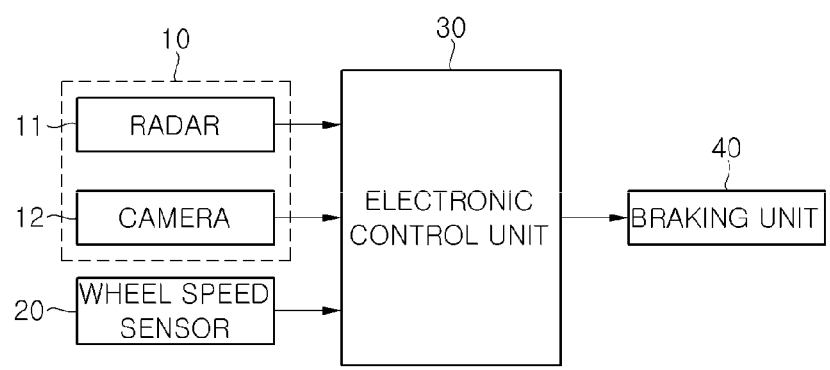
FIG. 1 is a block diagram for describing an emergency braking system for protecting a moving object according to an embodiment of the present invention.
Figure 2:
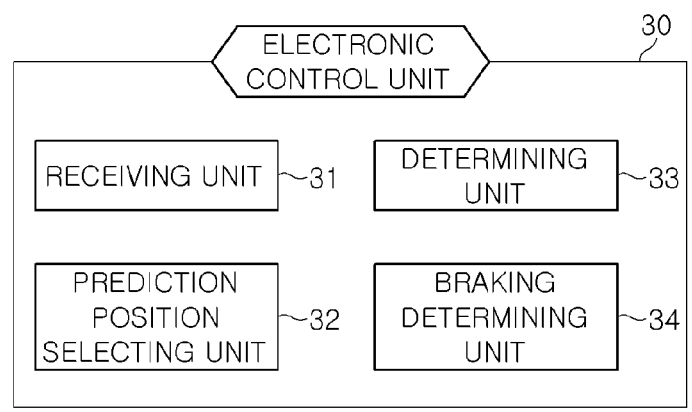
FIG. 2 is a block diagram for describing an electronic control unit illustrated in FIG. 1.

FIG. 1 is a block diagram for describing an emergency braking system for protecting a moving object according to an embodiment of the present invention, and FIG. 2 is a block diagram for describing an electronic control unit illustrated in FIG. 1.

Referring to FIG. 1, the emergency braking system according to the embodiment of the present invention includes a sensing unit 10 and an electronic control unit 30. The sensing unit 10 is installed in a vehicle and senses a moving object around the vehicle. When the moving object is sensed based on a sensing signal of the sensing unit 10, the electronic control unit 30 selects a lateral prediction position of the moving object according to a lateral movement of the moving object. When a collision is predicted with reference to the selected prediction position, the electronic control unit 30 provides an emergency braking control signal to a braking unit 40. When a collision is not predicted, the electronic control unit 30 suspends a braking control of the braking unit 40. The term "moving object" used herein is an moving object that is likely to collide with a side of a vehicle. The moving object may be a pedestrian, a bicycle, or a motorcycle.

In addition, the emergency braking system according to the embodiment of the present invention further includes a wheel speed sensor 20 that measures a wheel speed of the vehicle.

The sensing unit 10 includes a radar sensor 11 and a camera 12 that are installed in the vehicle.

Sensing signals, which are sensed through the radar sensor 11 and the camera 12, include a longitudinal distance between the vehicle and the moving object, a lateral distance between the vehicle and the moving object, and a lateral velocity. That is, the radar sensor 11 may measure a relative velocity of the vehicle, an acceleration of the vehicle, a distance to a target (a pedestrian, a bicycle, or a motorcycle) by using a transmission signal transmitted to the target and a reception signal reflected and returned from the target. In addition, the electronic control unit 30 may detect whether the moving object is a vehicle, a pedestrian, a bicycle, or a motorcycle, based on the sensing signal acquired through the camera 12.

The electronic control unit 30 may receive the sensing signals sensed through the radar sensor 11 and the camera 12. When the moving object (e.g., the pedestrian) is sensed through the fusion between the received sensing signals, the electronic control unit 30 may calculate a time to collision (TTC) by using the velocity of the vehicle and the longitudinal distance between the vehicle and the pedestrian so as to predict a lateral movement of the pedestrian. In addition, the electronic control unit 30 may determine an emergency braking control or an emergency braking suspension according to whether a lateral prediction position of the pedestrian calculated in consideration of the calculated TTC is located inside a vehicle width or outside the vehicle width. At this time, the electronic control unit 30 reflects the velocity of the vehicle to the TTC, wherein the velocity of the vehicle is based on the wheel speed measured through the wheel speed sensor 20.

Referring to FIG. 2, the electronic control unit 30 includes a receiving unit 31, a prediction position selecting unit 32, a determining unit 33, and a braking determining unit 34.

The receiving unit 31 receives measured signals from the radar sensor 11, the camera 12, and the wheel speed sensor 20. That is, the receiving unit 31 receives a target sensing signal from the radar sensor 11. The target sensing signal includes a distance to the target, a relative velocity with respect to the target, and an acceleration. The receiving unit 31 receives a sensing signal including a vehicle periphery image acquired from the camera 12. The target sensing signal includes a distance, a relative velocity, an acceleration with respect to a target closest to the vehicle among one or more targets located around the vehicle.

In addition, the receiving unit 31 receives the wheel speed from the wheel speed sensor 20. When the moving object (e.g., the pedestrian) is sensed through the fusion between the moving object (e.g., the pedestrian) sensing signals detected based on the target sensing signal received from the receiving unit 31 and the image signal received from the camera 12, the prediction position selecting unit 32 selects the lateral prediction position predicted to collide with the vehicle according to the lateral movement of the pedestrian.

More specifically, the prediction position selecting unit 32 calculates the TCC ($T_{TTC}$) by applying the vehicle velocity (V) determined based on the wheel speed received from the receiving unit 31 and the longitudinal distance ($d_{Long1}$) between the vehicle and the moving object, which is included in the moving object sensing signal sensed by the radar sensor 11, to Equation 1 below.

$$T_{TTC} = d_{Long1}/V \quad \text{[Equation 1]}$$

In addition, the prediction position selecting unit 32 selects a lateral prediction position ($d_{Lat2}$) of the moving object by applying a current lateral position ($d_{Lat1}$) of the moving object, a current lateral velocity ($v_{Lat1}$) of the moving object, and the TTC ($T_{TTC}$), which is calculated through Equation 1, to Equation 2 below.

$$d_{Lat2} = d_{Lat1} + v_{Lat1} \times T_{TTC} \quad \text{[Equation 2]}$$

The lateral position ($d_{Lat1}$) and the lateral velocity ($v_{Lat1}$) of the moving object are included in the sensing signal sensed by the radar sensor 11.

The determining unit 33 determines whether the lateral prediction position of the moving object selected by the prediction position selecting unit 32 is located inside the vehicle width or outside the vehicle width. When the lateral prediction position of the moving object is located inside the vehicle width, the determining unit 33 determines that the collision is predicted. When the lateral prediction position of the moving object is located outside the vehicle width, the determining unit 33 determines that the collision is not predicted.

When the determining unit 33 determines that the collision is predicted, the braking determining unit 34 provides the emergency braking control signal to the braking unit 40. When the determining unit 33 determines that the collision is not predicted, the braking determining unit 34 provides the emergency braking suspension signal so as to disable the braking unit 40. It has been described that the emergency braking suspension signal is provided to the braking unit 40 when the collision is not predicted, but it can be implemented by applying no braking control signal to the braking unit 40.

In addition, when the lateral prediction position of the moving object is located inside the vehicle width, the braking determining unit 34 determines whether the longitudinal distance between the vehicle and the moving object is within a preset warning control distance. When it is determined that the longitudinal distance between the vehicle and the moving object is within the preset warning control distance, the braking determining unit 34 determines whether the longitudinal distance is within a preset emergency braking control distance. When it is determined that the longitudinal distance is within the preset emergency braking control distance, the braking determining unit 34 provides the emergency braking control signal to the braking unit 40. When it is determined that the longitudinal distance is not within the preset emergency braking control distance, the braking determining unit 34 outputs a preset warning signal through, for example, a cluster, a buzzer, or a combination thereof.

In this way, when the moving object is a pedestrian, the lateral movement is active unlike the vehicle. Thus, the lateral prediction position of the pedestrian is predicted. When the predicted lateral prediction position is located inside the vehicle width or when the longitudinal distance is within the warning control distance and the emergency braking distance, the emergency braking signal is provided to the braking unit 40. If not, the braking control of the braking unit 40 can be suspended in a situation in which the collision does not occur even though the pedestrian is located within the warning control distance or the emergency braking distance.

A method for controlling the emergency braking system for protecting the moving object, which is configured as above, will be described below with reference to FIG. 3.

Figure 3:
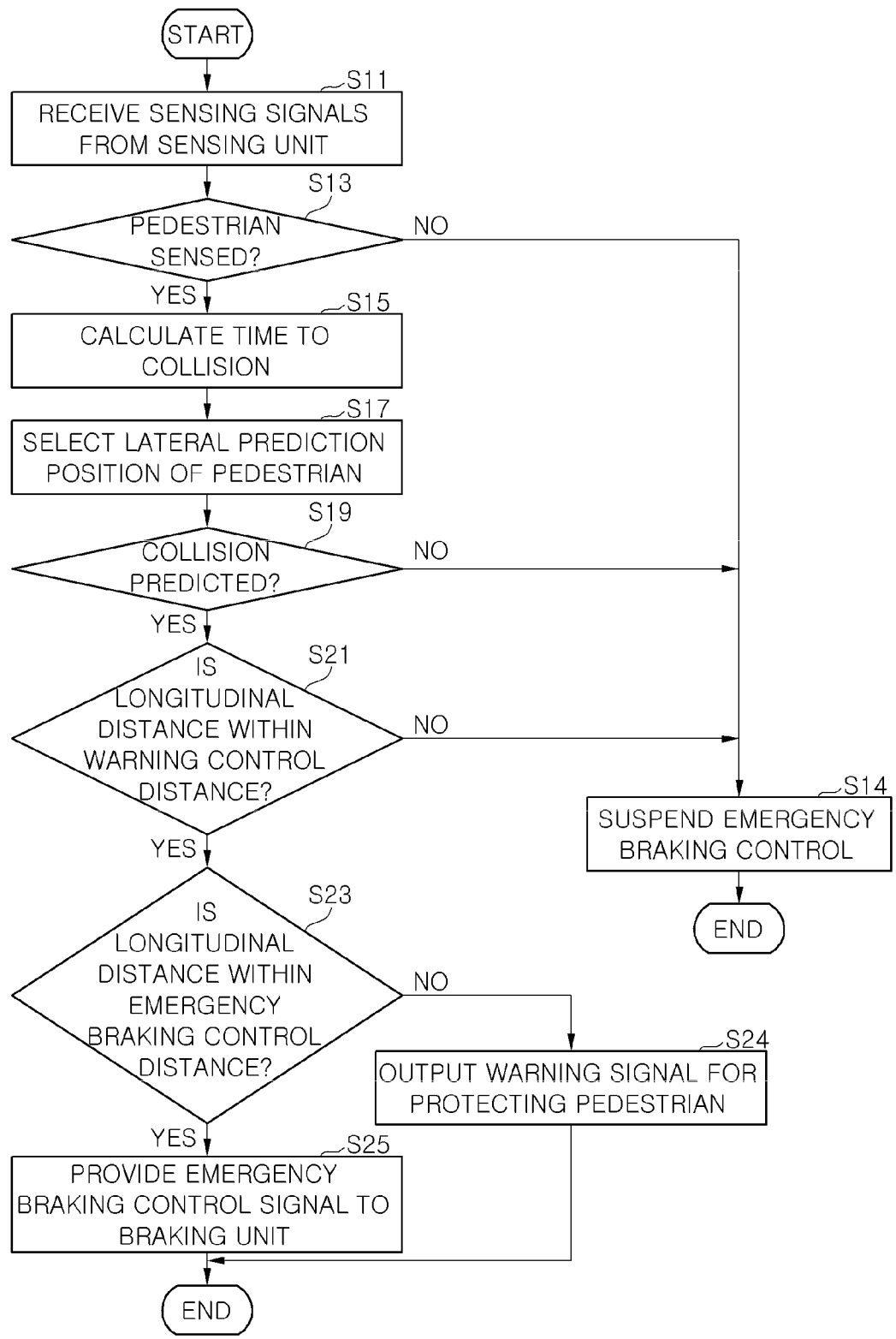
FIG. 3 is an operation flowchart for describing a method for controlling an emergency braking system for protecting a moving object according to an embodiment of the present invention.

FIG. 3 is an operation flowchart for describing a method for controlling the emergency braking system for protecting the moving object according to an embodiment of the present invention.

Referring to FIG. 3, the receiving unit 31 included in the electronic control unit 30 receives sensing signals sensed through the sensing unit 10, that is, the radar sensor 11, the camera 12, and the wheel speed sensor 20 (S11).

The determining unit 33 included in the electronic control unit 30 determines whether the pedestrian is detected through the fusion between the moving object (e.g., pedestrian) sensing signal detected based on the sensing signals sensed by the receiving unit 31, that is, the target sensing signal received from the radar sensor 11 and the image signal acquired from the camera 12 (S13).

When it is determined in step S13 that the pedestrian is not detected, the braking determining unit 34 included in the electronic control unit 30 provides the emergency braking suspension signal to the braking unit 40 or disables the braking unit 40 so as to suspend the emergency braking of the braking unit 40 (S14).

When it is determined in step S13 that the pedestrian is detected, the prediction position selecting unit 32 included in the electronic control unit 30 calculates the TTC based on the sensing signal received by the receiving unit 31 (S15). The TTC is calculated using Equation 1 above.

The prediction position selecting unit 32 included in the electronic control unit 30 selects the lateral prediction position of the pedestrian by applying the calculated TTC, and the lateral distance and the lateral velocity between the vehicle and the pedestrian to Equation 2 above (S17).

The determining unit 33 determines whether the collision is predicted, based on the selected lateral prediction position of the pedestrian (S19). That is, when the selected lateral prediction position of the pedestrian is located inside the vehicle width, the determining unit 33 determines that the collision is predicted. When the selected lateral prediction position of the moving object is located outside the vehicle width, the determining unit 33 determines that the collision is not predicted.

When it is determined in step S19 that the collision is not predicted based on the selected lateral prediction position of the pedestrian, that is, when the lateral prediction position of the pedestrian is located outside the vehicle width, the braking determining unit 34 proceeds to step S14 to provide the emergency braking suspension signal to the braking unit 40 or disable the braking unit 40 so as to suspend the emergency braking of the braking unit 40.

When it is determined in step S19 that the collision is predicted based on the selected lateral prediction position of the pedestrian, that is, when the lateral prediction position of the pedestrian is located inside the vehicle width, the determining unit 33 determines whether the longitudinal distance between the vehicle and the pedestrian is within a preset warning control distance (S21).

When it is determined in step S21 that the longitudinal distance is not within the preset warning control distance, the braking determining unit 34 proceeds to step S14 provide the emergency braking suspension signal to the braking unit 40 or disable the braking unit 40 so as to suspend the emergency braking of the braking unit 40.

When it is determined in step S21 that the longitudinal distance is within the preset warning control distance, the determining unit 33 determines whether the longitudinal distance is within a preset emergency braking control distance (S23).

When it is determined in step S23 that the longitudinal distance is not within the preset emergency braking control distance, the braking determining unit 34 outputs a preset warning signal (S24). At this time, the warning signal may be output as a buzzer sound or may be displayed on a cluster.

When it is determined in step S23 that the longitudinal distance is within the preset emergency braking control distance, the braking determining unit 34 provides the emergency braking control signal to the braking unit 40 (S25). Accordingly, the braking unit 40 performs the emergency braking, thereby preventing the collision with the pedestrian.

Figure 4:
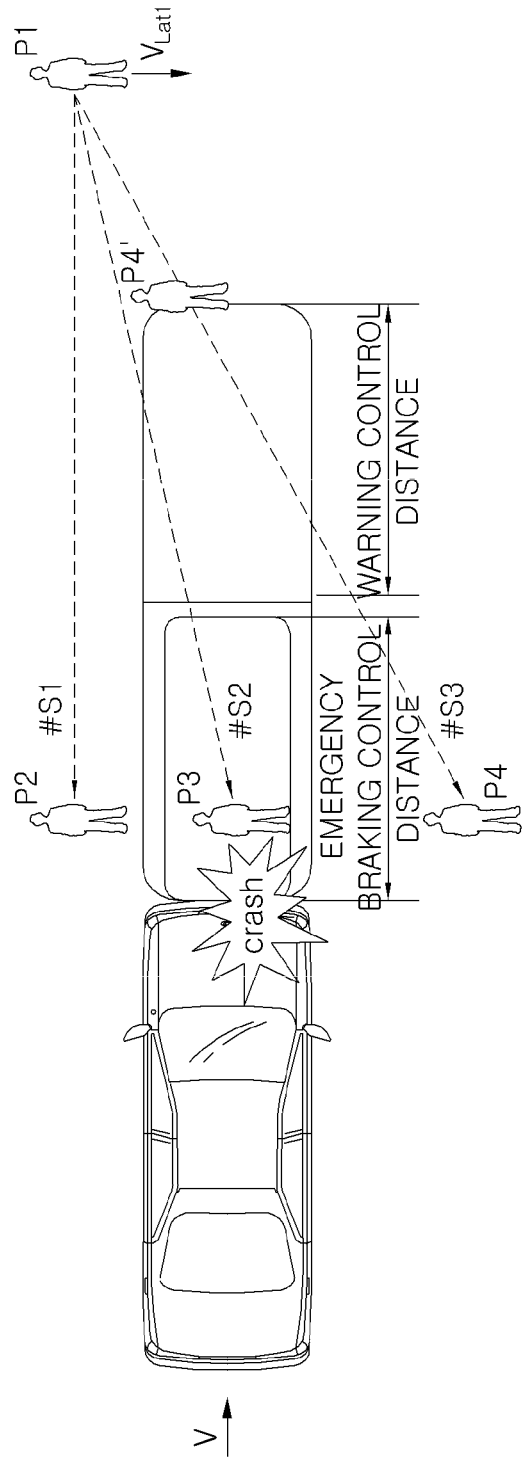
FIG. 4 is an exemplary diagram for describing an emergency braking, a warning, or an emergency braking suspension at a lateral prediction position of a pedestrian predicted to collide with a vehicle.

Referring to FIG. 4, in the emergency braking system for protecting the moving object, to which the present invention is applied, when a pedestrian P1 ahead is sensed while the vehicle is traveling at a velocity (V), lateral prediction positions P2, P3, P4, and P4' of the sensed pedestrian are selected. In the case of the lateral prediction position P3 of the pedestrian located inside the vehicle width, the emergency braking control signal is provided to the braking unit 40. In the case of the lateral prediction position P4 of the pedestrian, since it is located outside the vehicle width, the emergency braking is not operated unlike the related art. The lateral prediction position P4' of the pedestrian is an intermediate position between a start position P1 and a final position P4. Even though the lateral prediction position P4' of the pedestrian is located within the warning control distance, the warning or the braking is not performed because the collision does not occur at the lateral prediction position P4 of the pedestrian.

In this way, in the case of the scenario S3, the emergency braking control is suspended at the lateral prediction position P4 of the pedestrian P. Therefore, it is possible to remove the discomfort of the driver caused when the warning and the emergency braking are operated even in a situation in which the collision does not occur at the lateral prediction position P4 of the pedestrian P in the conventional emergency braking system.

Figure 5:
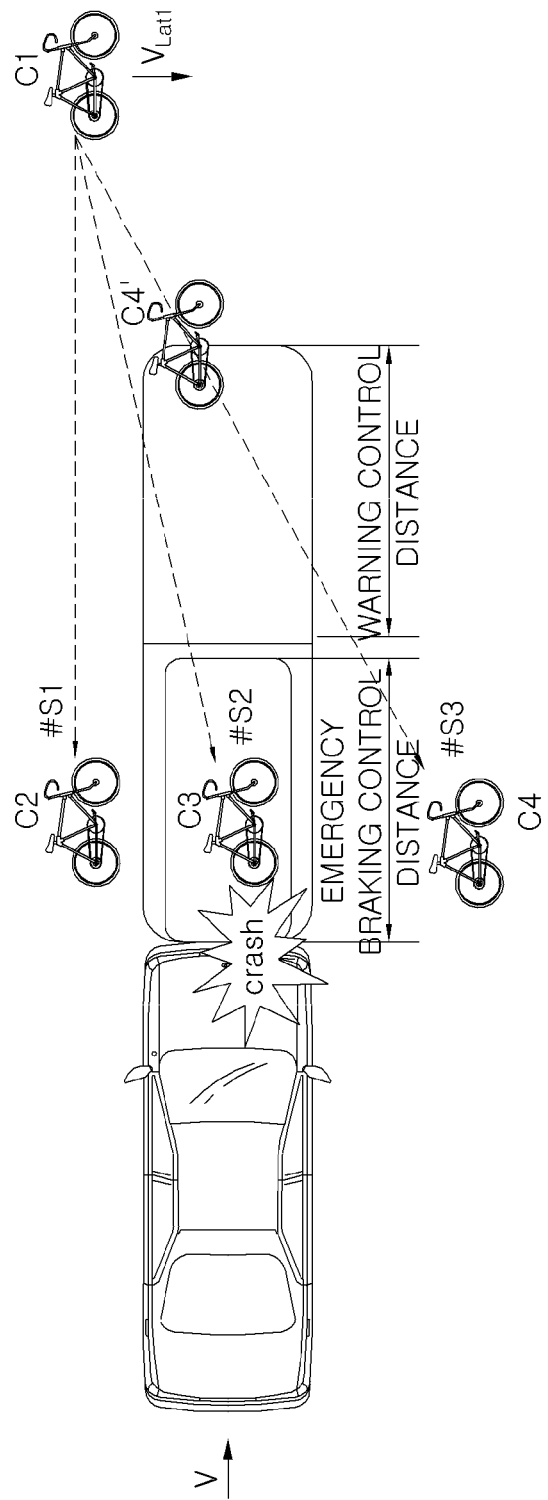
FIG. 5 is an exemplary diagram for describing an emergency braking, a warning, or an emergency braking suspension at a lateral prediction position of a bicycle predicted to collide with a vehicle.

FIG. 4 is a diagram illustrating a pedestrian as a moving object, and FIG. 5 is a diagram illustrating a bicycle as a moving object.

Referring to FIG. 5, in the emergency braking system for protecting the moving object, to which the present invention is applied, when a bicycle C1 ahead is sensed while the vehicle is traveling at a velocity (V), lateral prediction positions C2, C3, C4, and C4' of the sensed bicycle are selected. In the case of the lateral prediction position C3 of the bicycle located inside the vehicle width, the emergency braking control signal is provided to the braking unit 40. In the case of the lateral prediction position C4 of the bicycle, since it is located outside the vehicle width, the emergency braking is not operated unlike the related art. The lateral prediction position C4' of the bicycle is an intermediate position between a start position C1 and a final position C4. Even though the lateral prediction position C4' of the bicycle is located within the warning control distance, the warning or the braking is not performed because the collision does not occur at the lateral prediction position C4 of the bicycle. Similarly, in the case of the scenario S3, the emergency braking control is suspended at the lateral prediction position C4 of the bicycle. Therefore, it is possible to remove the discomfort of the driver caused when the warning and the emergency braking are operated even in a situation in which the collision does not occur at the lateral prediction position C4 of the bicycle in the conventional emergency braking system.

Figure 6:
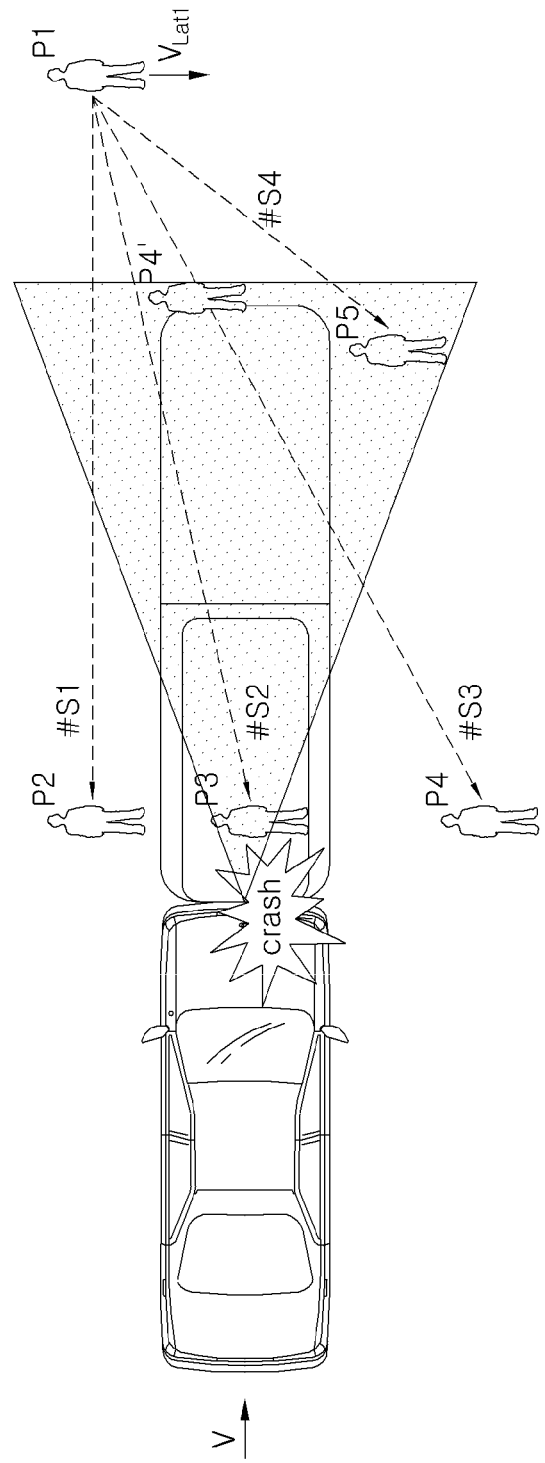
FIG. 6 is an exemplary diagram illustrating a sensing region of a radar in FIG. 4.

FIG. 6 is a diagram illustrating a sensing region of the radar sensor in FIG. 4. When the lateral prediction position P5 is located in the sensing region outside the vehicle width, not inside the vehicle width, in the sensing region of the radar sensor, the emergency braking is not operated. Only when the lateral prediction position is located in the sensing region inside the vehicle width, the corresponding control signal is output according to whether the position is the emergency braking control distance or the warning control distance.

Regarding the criteria of determining whether the lateral prediction position is located inside the vehicle width, a position value of a sensing unit installed in a vehicle is defined. When the lateral prediction position is located below a preset reference value (for example, 2 m) from the position value, the condition of operating the emergency braking is satisfied. The emergency braking or the warning is output based on the distance between the lateral prediction position and the vehicle in the satisfied condition. When exceeding the preset reference value, the emergency braking is suspended.

According to the embodiment of the present invention, the emergency braking control signal is provided to the braking unit when the lateral prediction position of the moving object is located inside the vehicle width, and the emergency braking control of the braking unit is suspended when the lateral prediction position of the moving object is located outside the vehicle width. Therefore, even though the moving object is located within the warning control distance or the emergency braking control distance, the automatic emergency braking control is suspended in the non-collision situation, thereby removing the discomfort or risk of the driver caused when the warning and the braking control are unnecessarily operated.

While the embodiments of the present invention have been described with reference to the specific embodiments, it will be apparent to those skilled in the art that various changes and modifications may be made without departing from the spirit and scope of the invention as defined in the following claims.

DESCRIPTION OF REFERENCE NUMERALS

| 10: sensing unit | 11: radar sensor |
|---|---|
| 12: camera | 20: wheel speed sensor |

| | |
|---|---|
| 30: electronic control unit | 31: receiving unit |
| 32: prediction position selecting unit | 33: determining unit |
| 34: braking determining unit | 40: braking unit |

What is claimed is:

1. An emergency braking system, including a sensing unit installed in a vehicle to sense a moving object around the vehicle, the emergency braking system comprising:
   a receiving unit that receives sensing signals sensed by the sensing unit;
   a prediction position selecting unit that, when the moving object is sensed through fusion between the sensing signals received by the receiving unit, selects a lateral prediction position of the sensed moving object predicted to collide with the vehicle according to a lateral movement of the sensed moving object; and
   a braking determining unit that determines a braking control suspension, a warning, an emergency braking, or an emergency braking according to whether
      the lateral prediction position selected by the prediction position selecting unit is located inside a vehicle width or outside the vehicle width and
      a longitudinal distance between the vehicle and the moving object is within a preset warning braking distance and a preset emergency braking control distance.

2. The emergency braking system according to claim 1, wherein the prediction position selecting unit calculates a time to collision (TTC) by using a velocity of the vehicle and a longitudinal distance between the vehicle and the sensed moving object, and selects the lateral prediction position of the sensed moving object by using the calculated time to collision, a lateral distance between the vehicle and the sensed moving object, and a lateral velocity of the sensed moving object.

3. The emergency braking system according to claim 1, wherein the braking determining unit
   when the lateral prediction position is located inside the vehicle width and the longitudinal distance is out of the preset warning braking distance, suspends a control of a braking unit of the vehicle,
   when the lateral prediction position is located inside the vehicle width and the longitudinal distance is within the preset warning braking distance and out of the preset emergency braking control distance, provides a preset warning signal to the sensed moving object and suspends the control of the braking unit of the vehicle,
   when the lateral prediction position is located inside a vehicle width and the longitudinal distance is within the preset emergency braking control distance, provide an emergency braking control signal to the braking unit of the vehicle, and
   when the lateral prediction position is located outside the vehicle width, suspends a control of the braking unit of the vehicle.

4. The emergency braking system according to claim 1, wherein the sensed moving object is a pedestrian, a bicycle, or a motorcycle.

5. A method for controlling an emergency braking system, including a sensing unit installed in a vehicle to sense a moving object around the vehicle, the method comprising:
   receiving sensing signals sensed by the sensing unit;
   when the moving object is sensed through fusion between the received sensing signals, selecting a lateral prediction position of the sensed moving object predicted to collide with the vehicle according to a lateral movement of the sensed moving object;
   determining a braking control suspension, a warning, an emergency braking, or an emergency braking according to whether
      the lateral prediction position selected by the prediction position selecting unit is located inside a vehicle width or outside the vehicle width and
      a longitudinal distance between the vehicle and the sensed moving object is within a preset warning braking distance and a preset emergency braking control distance.

6. The method according to claim 5, wherein the selecting of the lateral prediction position comprises:
   calculating a time to collision (TTC) by using a velocity of the vehicle and a longitudinal distance between the vehicle and the sensed moving object; and
   selecting a lateral prediction position of the sensed moving object by using the calculated time to collision, a lateral distance between the vehicle and the sensed moving object, and a lateral velocity of the sensed moving object.

7. The method according to claim 5, wherein determining a braking control suspension, a warning, an emergency braking, or an emergency braking comprises:
   when the lateral prediction position is located inside the vehicle width and the longitudinal distance is out of the preset warning braking distance, suspending a control of the braking unit of the vehicle;
   when the lateral prediction position is located inside the vehicle width and the longitudinal distance is within the preset warning braking distance and out of the preset emergency braking control distance, providing a preset warning signal to the sensed moving object and suspends the control of the braking unit of the vehicle; and
   when the lateral prediction position is located inside a vehicle width and the longitudinal distance is within the preset emergency braking control distance, providing an emergency braking control signal to the braking unit of the vehicle.

* * * * *